(12) United States Patent
Woodford

(10) Patent No.: US 7,333,833 B2
(45) Date of Patent: Feb. 19, 2008

(54) LOW-NOISE BLOCK CONTROLLER WITHIN A SET-TOP BOX

(75) Inventor: Scott Allan Woodford, Austin, TX (US)

(73) Assignee: Silicon Laboratories, Austin, TX (US)

(*) Notice: Subject to any disclaimer, the term of this patent is extended or adjusted under 35 U.S.C. 154(b) by 825 days.

(21) Appl. No.: 10/735,224

(22) Filed: Dec. 15, 2003

(65) Prior Publication Data

US 2005/0130582 A1 Jun. 16, 2005

(51) Int. Cl.
*H04B 1/38* (2006.01)
(52) U.S. Cl. .................. 455/557; 725/100
(58) Field of Classification Search ............. 455/3.02, 455/3.03, 3.04, 3.05, 3.06, 84, 74, 78, 556.1, 455/572, 557, 127.1, 213, 333; 725/69, 72, 725/100, 138, 139
See application file for complete search history.

(56) References Cited

U.S. PATENT DOCUMENTS 4,470,015 A * 9/1984 Hirschi et al. .............. 324/329
7,207,054 B1 * 4/2007 Richards et al. ............ 725/72
2002/0137483 A1 * 9/2002 Smith et al. ............... 455/130

* cited by examiner

*Primary Examiner*—Tu Nguyen
(74) *Attorney, Agent, or Firm*—Antony P. Ng; Dillon & Yudell LLP

(57) ABSTRACT

A low-noise block (LNB) control device within a set-top box is disclosed. The LNB control device is capable of controlling modulation of an alternating waveform on a direct current (DC) voltage from a DC power supply to an LNB amplifier. The LNB control device includes a power supply control module, an LNB signaling module and a switch. In response to a power supply feedback signal received from the DC power supply, the power supply control module sends a control signal to the DC power supply. In addition, the LNB signalling module provides a switch control signal and a modulating waveform to the switch. Under the control of switch control signal, the switch selectively sends the modulating waveform to a summing circuit that is located external to the LNB control device. Within the summing circuit, the modulating waveform is added to the DC voltage from the DC power supply.

17 Claims, 3 Drawing Sheets

LOW-NOISE BLOCK CONTROLLER WITHIN A SET-TOP BOX

BACKGROUND OF THE INVENTION

1. Technical Field

The present invention relates to set-top boxes in general, and in particular to a low-noise block (LNB) controller within a set-top box. Still more particularly, the present invention relates to an LNB controller within a set-top box for controlling an LNB amplifier on a directional receiver antenna.

2. Description of Related Art

A digital satellite communication system typically employs a ground-based transmitter to beam an uplink signal to a satellite that is positioned in a geosynchronous orbit. In turn, the satellite relays the signal back to various ground-based receivers. Such a digital satellite communication system permits a household (or business) subscribing to a satellite television service to receive audio and video signals directly from the satellite by means of a directional receiver antenna that is typically affixed to the roof or an external wall of the subscriber's residence.

A directional receiver antenna constructed to receive satellite signals typically includes a dish-shaped reflector that has a feed support arm protruding outward from the front surface of the reflector. The feed support arm supports an assembly in the form of a low-noise block (LNB) amplifier having an integrated LNB feed. The reflector collects and focuses satellite signals onto the LNB feed.

The satellite signals are commonly received at the Ku-band or C-band. The received satellite signals are first amplified by the LNB amplifier and then downshifted to a predetermined frequency band, typically in the L-band. The satellite signals are subsequently sent via a coaxial cable to a set-top box typically located adjacent to a subscriber's television.

The components within a set-top box can be divided into two major sections, namely, an LNB control section and a signal processing section. The signal processing section is beyond the scope of the present disclosure. The present disclosure provides an improved control device for the LNB control section of a set-top box.

SUMMARY OF THE INVENTION

In accordance with a preferred embodiment of the present invention, a low-noise block (LNB) control device capable of controlling modulation of an alternating waveform on a direct current (DC) voltage from a DC power supply to an LNB amplifier includes a power supply control module, an LNB signaling module and a switch. In response to a power supply feedback signal received from the DC power supply, the power supply control module sends a control signal to the DC power supply. In addition, the LNB signalling module provides a switch control signal and a modulating waveform to the switch. Under the control of switch control signal, the switch selectively sends the modulating waveform to a summing circuit that is located external to the LNB control device. Within the summing circuit, the modulating waveform is added to the DC voltage from the DC power supply.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
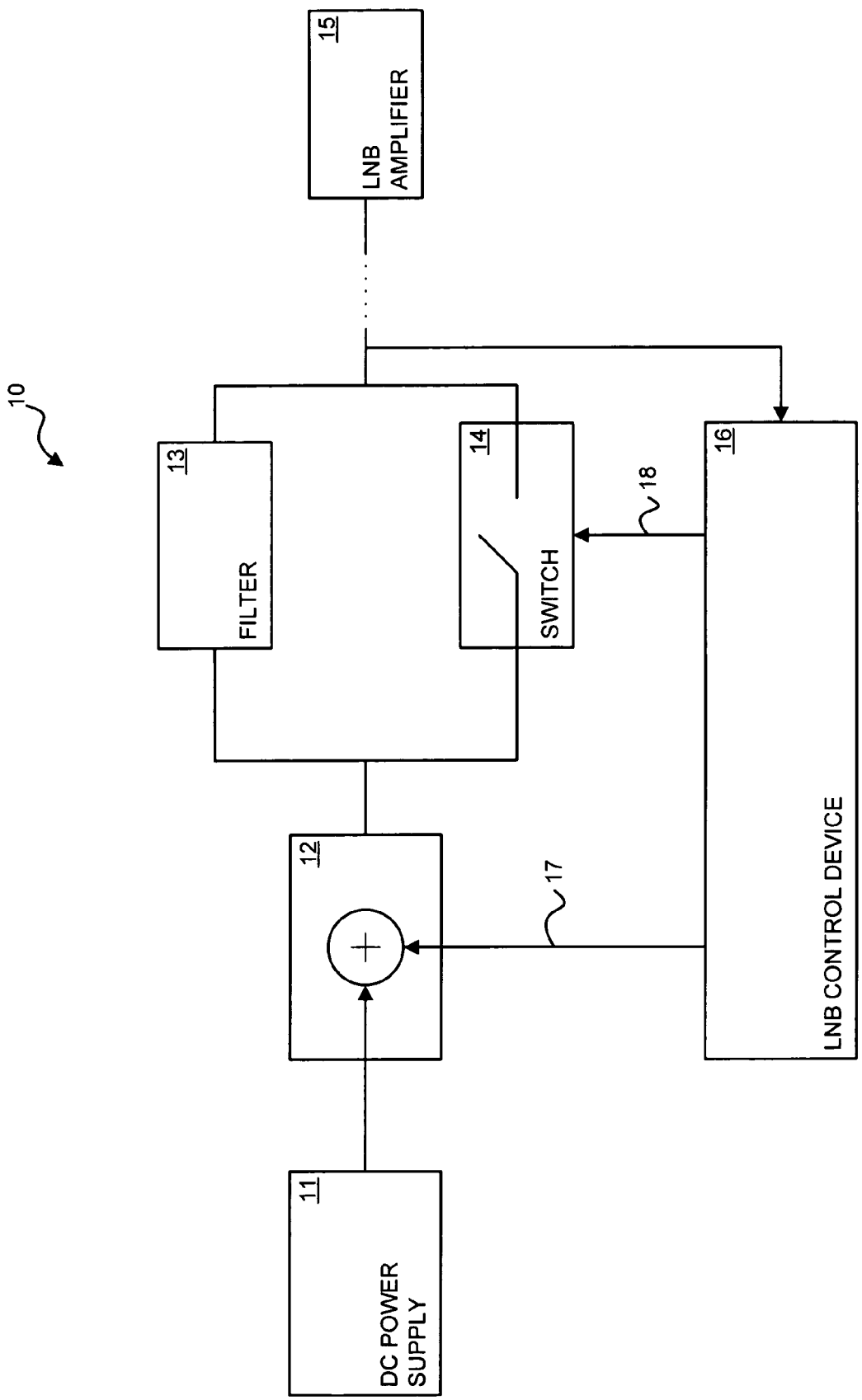
FIG. 1 is a conceptual diagram of a low-noise block control section within a set-top box, in accordance with a preferred embodiment of the present invention.

Referring now to the drawings and, in particular, to FIG. 1, there is depicted a conceptual diagram of a low-noise block (LNB) control section within a set-top box, in accordance with a preferred embodiment of the present invention. As shown, an LNB control section 10 includes a DC power supply 11, a summing circuit 12, a filter 13 and a switch 14. LNB control section 10 controls the functionality of an LNB amplifier 15 located remotely from LNB control section 10.

As part of LNB control section 10, an LNB control device 16 generates various control signals. For example, LNB control device 16 provides a modulating signal to be added to a DC voltage, which is generated by DC power supply 11, via an input 17 at summing circuit 12. In addition, LNB control device 16 provides a switch control signal to control switch 14 via an input 18 at switch 14.

LNB control section 10 operates under two separate modes, namely, a transmitting mode and a receiving mode. During the transmitting mode, switch 14 is closed, allowing the DC voltage along with the modulating signal to send to LNB amplifier 15 bypassing filter 13. Also, filter 13 appears to LNB amplifier 15 as a low or zero impedance device during the transmitting mode. During the receiving mode, switch 14 is open to provide the desired impedance of filter 13 between DC power supply 11 and LNB amplifier 15.

Figure 2:
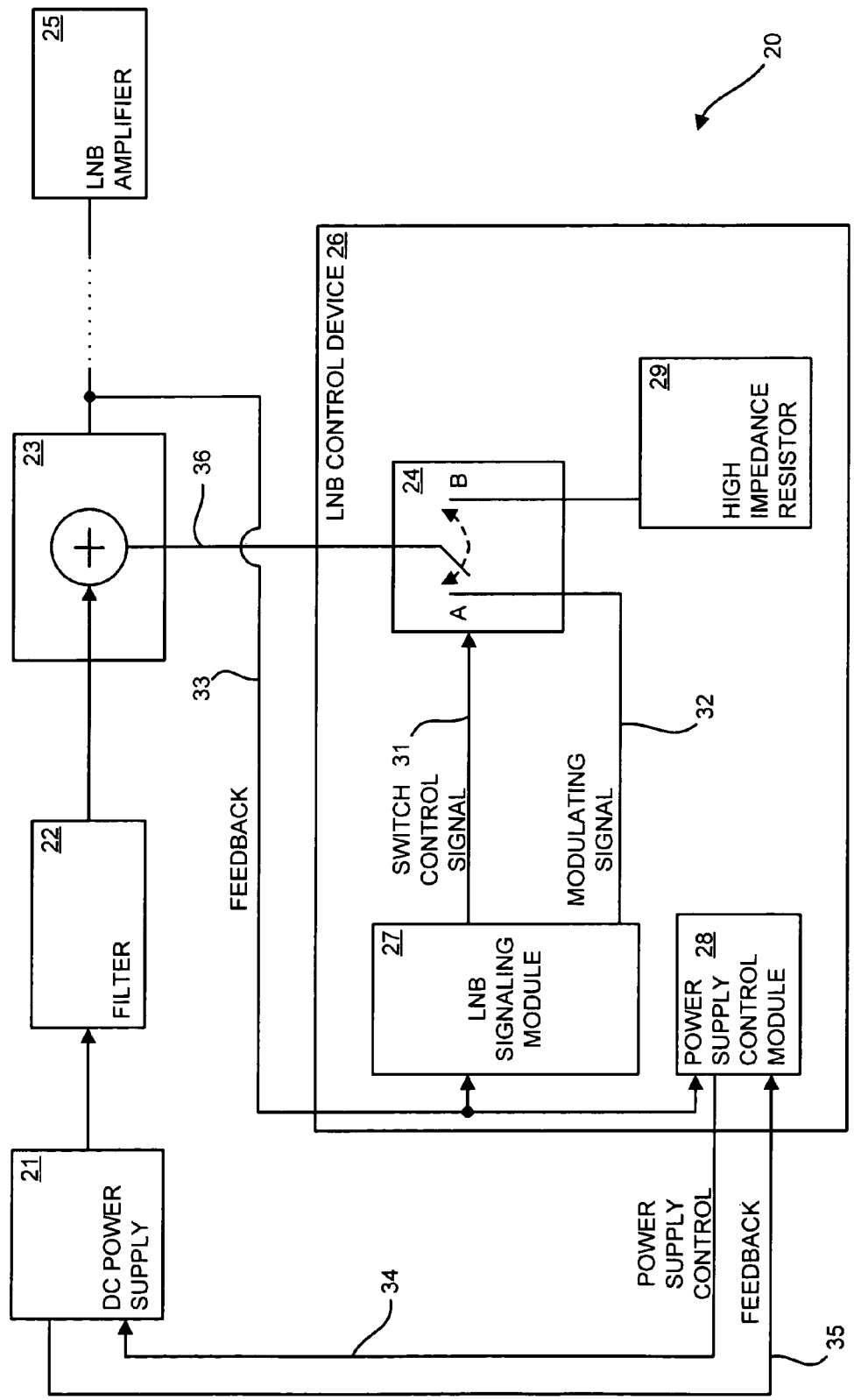
FIG. 2 is a block diagram of a low-noise block control section within a set-top box, in accordance with a preferred embodiment of the present invention.

With reference now to FIG. 2, there is depicted a block diagram of an LNB control section within a set-top box, in accordance with a preferred embodiment of the present invention. As shown, an LNB control section 20 includes a DC power supply 21, a filter 22, a summing circuit 23, and an LNB control device 26. Filter 22 has a relatively low DC impedance and a defined AC impedance. As such, filter 22 does not significantly impair DC power supply 21 from providing power to an LNB amplifier 25 while providing a specific AC impedance to LNB amplifier 25 at the same time. Summing circuit 23 allows a modulating signal to be added to a DC voltage that is generated by DC power supply 21, via an input 36 at summing circuit 23.

LNB control device 26 includes a switch 24, an LNB signaling module 27, a power supply control module 28 and a high impedance resistor 29. Switch 24 can be switched to a position A or a position B according to a switch control signal 31 provided by LNB signaling module 27. In the present embodiment, position A of switch 24 is associated with a modulating signal 32 provided by LNB signaling module 27, and position B of switch 24 is associated with a high impedance provided by high impedance resistor 29. Thus, modulating signal 32 is sent to summing circuit 23 when switch 24 is at position A, and a high impedance is connected to summing circuit 23 when switch 24 is at position B.

In addition, LNB control device 26 controls DC power supply 21 via a power supply control signal generated by power supply control module 28 sent to DC power supply 21 on a power supply control line 34. In turn, DC power supply 21 provides a feedback signal to power supply control module 28 of LNB control device 26 via a feedback line 35. Power supply control module 28 sends the power supply control signal to DC power supply 21 according to the feedback signal received from DC power supply 21. LNB control device 26 also receives a feedback signal from LNB amplifier 25 via a feedback line 33.

LNB control section 20 is preferably situated within a set-top box that is typically located adjacent to a satellite television subscriber's television. LNB amplifier 25 is preferably located on a feed support arm of a directional receiver antenna that is typically located remotely from LNB control section 20. LNB control section 20 controls the functionality of LNB amplifier 25 on the direction receiver antenna.

As mentioned above, LNB control section 20 operates under two separate and distinct modes, namely, a transmitting mode and a receiving mode. During the transmitting mode, switch 24 is located at position A such that the DC voltage from DC power supply 21 along with modulating signal 32 are allowed to pass to LNB amplifier 25. LNB amplifier 25 "sees" filter 22 and summing circuit 23 as negligibly low impedance devices during the transmitting mode. During the receiving mode, switch 24 is located at position B. With switch 24 being at position B, the AC impedance presented to LNB amplifier 25 is dominated by the AC impedance of filter 22 if the impedance of high impedance resistor 29 is chosen to be relatively high. LNB amplifier 25 "sees" filter 22 as a high impedance device during the receiving mode. Thus, it is imperative that the impedance value of high impedance resistor 29 is chosen to be high enough so that the impedance presented to LNB amplifier 25 can be dominated by the impedance of filter 22.

Figure 3:
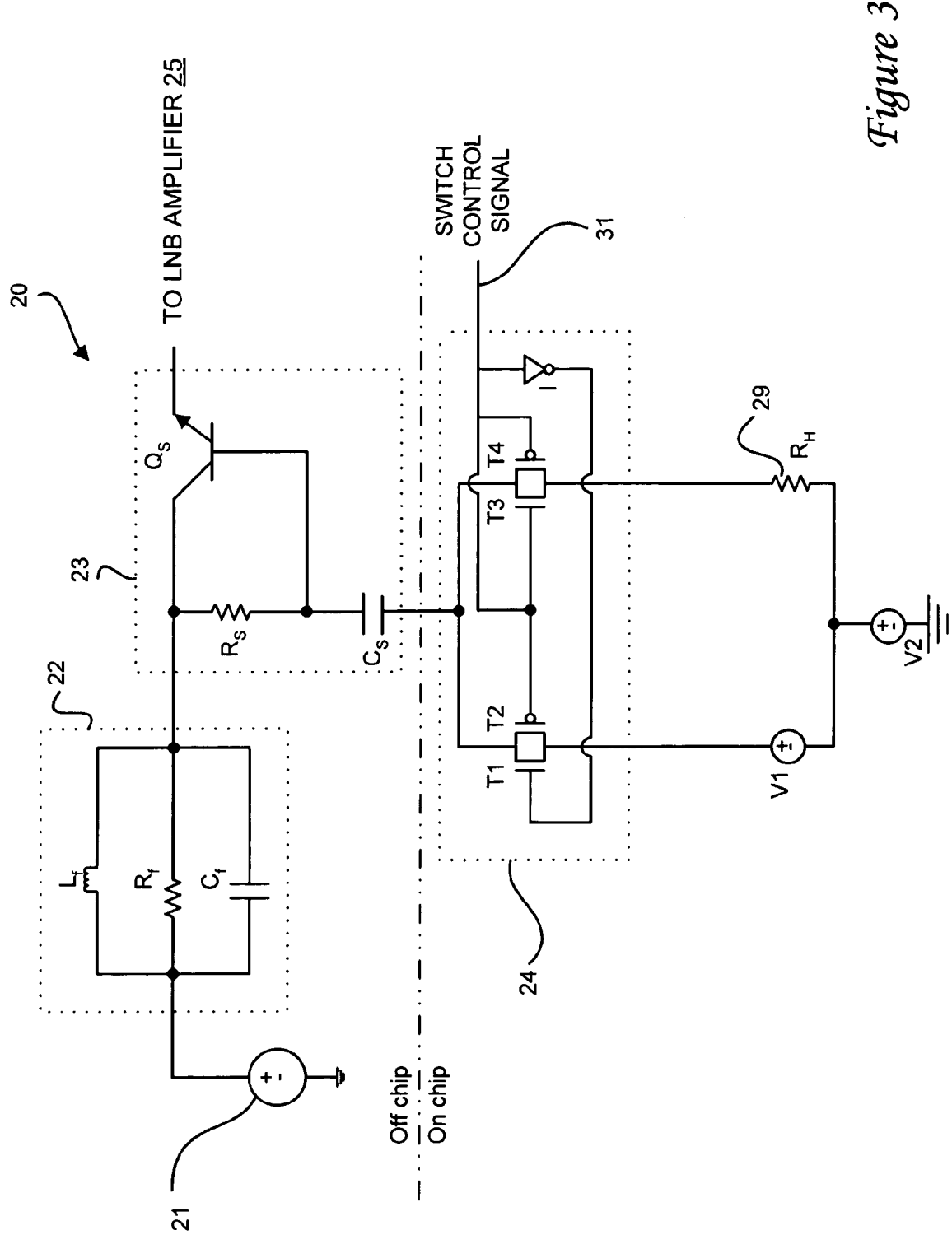
FIG. 3 is a circuit diagram of the low-noise block control section from FIG. 2, in accordance with a preferred embodiment of the present invention.

Referring now to FIG. 3, there is illustrated a circuit diagram of LNB control section 20, in accordance with a preferred embodiment of the present invention. As shown, DC power supply 21, filter 22 and summing circuit 23 of LNB control section 20 are discrete components located outside LNB control device 26. Filter 22 includes an inductor $L_f$, a resistor $R_f$ and a capacitor $C_f$ connected parallel to each other. Preferably, the values of inductor $L_f$, resistor $R_f$ and capacitor $C_f$ are 100 μH, 15 Ω and 0.47 μF, respectively. Summing circuit 23 includes a resistor $R_s$, a capacitor $C_s$ and a transistor $Q_s$. Resistor $R_s$ is connected in series with capacitor $C_s$. The collector of transistor $Q_s$ is connected to resistor $R_s$, and the base of transistor $Q_s$ is connected to the node between resistor $R_s$ and capacitor $C_s$. The emitter of transistor $Q_s$ is connected to LNB amplifier 25. Preferably, the values of resistor $R_s$ and capacitor $C_s$ are 2.2 kΩ and 0.1 μF, respectively. Transistor $Q_s$ is preferably a darlington NPN transistor.

Switch 24, which is located within LNB control device 26, includes transistors T1-T4 and an inverter I. Transistors T1-T4 are preferably field effect transistors (FETs), with transistors T1 and T3 being n-channel FETs and transistors T2 and T4 being p-channel FETs. Switch 24 is also connected to high impedance resistor 29, a modulating voltage source V1 and offset voltage source V2. The resistance of high impedance resistor 29 is preferably 100 kΩ. Preferably, the voltage of modulating voltage source V1 is approximately ±0.4 V, and the voltage of offset voltage source V2 is approximately 2.6 V.

Transistors T1 and T2 are connected to each other in a transmission gate configuration. Similarly, transistors T3 and T4 are connected to each other in a transmission gate configuration. The sources of transistors T1-T4 are connected to capacitor $C_s$ of summing circuit 23. The drains of transistors T1-T2 are connected to the positive terminal of modulating voltage source V1. The drains of transistors T3-T4 are connected to high impedance resistor 29. Offset voltage source V2 couples modulating voltage source V1 and high impedance resistor 29 to ground.

LNB control section 20 enters the transmitting mode when switch control signal 31 is set to a logic low level. This turns the transmission gate formed by transistors T1-T2 on and the transmission gate formed by transistors T3-T4 off. The modulating signal from modulating voltage source V1 can then modulate the voltage to LNB amplifier 25 through capacitor $C_s$, resistor $R_s$, and transistor $Q_s$.

LNB control section 20 enters the receiving mode when switch control signal 31 is set to a logic high level. This turns the transmission gate formed by transistors T3-T4 on and the transmission gate formed by transistors T1-T2 off. Since the resistance of resistor $R_s$ is much smaller than the resistance of high impedance resistor 29 (i.e., $R_s<<R_H$), the base of transistor $Q_s$ is effectively coupled to the collector of transistor $Q_s$, causing transistor $Q_s$ to act as a diode. The impedance seen at the emitter of transistor $Q_s$ is now the impedance of diode-connected transistor $Q_s$ in series with the impedance of filter 22. Since the impedance of diode-connected transistor $Q_s$ is negligibly small, filter 22, which is formed by inductor $L_f$, resistor $R_f$ and capacitor $C_f$, dominates the impedance seen by LNB amplifier 25.

As has been described, the present invention provides an improved LNB control section within a set-top box.

While the invention has been particularly shown and described with reference to a preferred embodiment, it will be understood by those skilled in the art that various changes in form and detail may be made therein without departing from the spirit and scope of the invention.

What is claimed is:

1. A low-noise block (LNB) control device capable of controlling modulation of an alternating waveform on a direct current (DC) voltage from a DC power supply to an LNB amplifier, said LNB control device comprising:
    an LNB signalling module for providing a switch control signal and a modulating waveform; and
    a switch circuit for selectively sending said modulating waveform to a summing circuit external to said LNB control device according to said switch control signal, wherein said summing circuit adds said modulating waveform to said DC voltage.

2. The LNB control device of claim 1, wherein said LNB control device further includes a power supply control module for receiving a power supply feedback signal from said DC power supply, and for sending a control signal to said DC power supply in response to said received power supply feedback signal.

3. The LNB control device of claim 1, wherein said LNB control device further includes a high impedance resistor.

4. The LNB control device of claim 1, wherein said LNB control device further includes a modulating voltage source and an offset voltage source.

5. The LNB control device of claim 1, wherein said switch circuit includes at least one transistor.

6. The LNB control device of claim 1, wherein said summing circuit includes a resistor, a capacitor and a darlington transistor.

7. The LNB control device of claim 6, wherein said darlington transistor is a darlington NPN transistor.

8. The LNB control device of claim 1, wherein said LNB control device is further coupled to a filter.

9. The LNB control device of claim 8, wherein said filter includes an inductor and resistor.

10. The LNB control device of claim 9, wherein said filter includes a capacitor.

11. A satellite receiver comprising:
   a DC power supply for providing a DC signal;
   a filter circuit, coupled to said DC power supply, for filtering said DC signal, said filter circuit includes an inductor, a resistor and a capacitor connected in parallel;
   a low-noise block (LNB) control device, coupled to said DC power supply, for receiving a power supply feedback signal from said DC power supply to generate a power supply control signal to said DC power supply, and for generating a modulating signal; and
   a summing circuit, coupled to said LNB control device, for adding said modulating signal to said DC signal.

12. The satellite receiver of claim 11, wherein said summing circuit includes a capacitor, a darlington transistor and a resistor.

13. The satellite receiver of claim 12, wherein said darlington transistor is a darlington NPN transistor.

14. The satellite receiver of claim 11, wherein said LNB control device further includes
   a power supply control module for receiving said power supply feedback signal from said DC power supply, and for sending said power supply control signal to said DC power supply in response to said received power supply feedback signal;
   an LNB signalling module for providing a switch control signal and said modulating waveform; and
   a switch circuit for selectively sending said modulating waveform to said summing circuit according to said switch control signal.

15. The satellite receiver of claim 14, wherein said switch circuit includes at least one transistor.

16. The satellite receiver of claim 14, wherein said LNB control device further includes a high impedance resistor.

17. The satellite receiver of claim 14, wherein said LNB control device further includes a modulating voltage source and an offset voltage source.

* * * * *